(12) United States Patent
Yogesha et al.

(10) Patent No.: US 12,148,311 B2
(45) Date of Patent: Nov. 19, 2024

(54) SYSTEMS AND METHODS FOR MANAGING ENERGY USE IN AUTOMATED VEHICLES

(71) Applicant: Honeywell International Inc., Morris Plains, NJ (US)

(72) Inventors: Aralakuppe Yogesha, Bangalore (IN); Shouvik Das, Bangalore (IN); Mohammed Ibrahim Mohideen, Bangalore (IN); Perumal Kumar, Bangalore (IN); Rafeek Sainudeen, Bangalore (IN); Parag Rao, Bangalore (IN); Abhishek Alladi, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 285 days.

(21) Appl. No.: 17/007,822

(22) Filed: Aug. 31, 2020

(65) Prior Publication Data

US 2021/0407303 A1    Dec. 30, 2021

(30) Foreign Application Priority Data

Jun. 30, 2020   (IN) .............................. 202041027835

(51) Int. Cl.
*B64U 30/20*        (2023.01)
*G05D 1/00*         (2006.01)
(Continued)

(52) U.S. Cl.
CPC ......... *G08G 5/0039* (2013.01); *G05D 1/0088* (2013.01); *G05D 1/042* (2013.01);
(Continued)

(58) Field of Classification Search
None
See application file for complete search history.

(56) References Cited

U.S. PATENT DOCUMENTS 9,852,642 B2    12/2017  Butler et al.
9,959,771 B1 *   5/2018  Carlson ................ G08G 5/0039
(Continued)

FOREIGN PATENT DOCUMENTS

CN         106697271 A      5/2017
WO    WO-2018043820 A1 *    3/2018  ............. B64C 39/02

OTHER PUBLICATIONS

Leonard, et al., "Energy management in swarm of Unmanned Aerial Vehicles," May 28, 2013, 2013 International Confrerence on Unmanned Aircraft Systems, downloaded from "https://ieeexplore.ieee.org/document/6564681".

(Continued)

*Primary Examiner* — Jelani A Smith
*Assistant Examiner* — Davin Seol
(74) *Attorney, Agent, or Firm* — Alston & Bird LLP

(57) ABSTRACT

Disclosed are methods, systems, and non-transitory computer-readable medium for managing energy use in a vehicle. For instance, the method may include receiving forecasted data from a first external source, receiving real-time data corresponding to at least one weather parameter at a first location at a first time, and continuously determining whether to perform an adjustment to a control parameter of the vehicle by using a machine learning model that is based on the forecasted data for the at least one weather parameter, the real-time data for the at least one weather parameter, a battery condition of the vehicle, and/or an estimated amount of energy consumed by traveling along a first navigation path.

20 Claims, 9 Drawing Sheets

(51) Int. Cl.
  *G06N 20/00*  (2019.01)
  *G08G 5/00*  (2006.01)
(52) U.S. Cl.
  CPC ........... *G05D 1/1062* (2019.05); *G06N 20/00* (2019.01); *G08G 5/0069* (2013.01); *G08G 5/0091* (2013.01); *B64U 30/20* (2023.01); *B64U 2201/10* (2023.01)

(56) References Cited

U.S. PATENT DOCUMENTS

| | | | |
|---|---|---|---|
| 10,068,489 B2* | 9/2018 | Brown | G08G 5/0039 |
| 10,197,631 B2 | 2/2019 | Barfield, Jr. et al. | |
| 10,369,899 B2 | 8/2019 | Hettrich et al. | |
| 10,372,122 B2 | 8/2019 | Zach | |
| 10,410,291 B1 | 9/2019 | Binion et al. | |
| 2012/0158280 A1* | 6/2012 | Ravenscroft | G08G 5/0034 701/400 |
| 2016/0140853 A1* | 5/2016 | Smith | G08G 5/0013 701/423 |
| 2016/0307447 A1 | 10/2016 | Johnson et al. | |
| 2017/0081045 A1 | 3/2017 | Byers et al. | |
| 2018/0004207 A1 | 1/2018 | Michini et al. | |
| 2018/0004231 A1 | 1/2018 | Michini et al. | |
| 2018/0074189 A1* | 3/2018 | Khatwa | G01W 1/00 |
| 2018/0238698 A1* | 8/2018 | Pedersen | G06N 5/048 |
| 2018/0292826 A1* | 10/2018 | DeFelice | A01G 15/00 |
| 2018/0346225 A1* | 12/2018 | Winkle | B64C 39/024 |
| 2019/0033863 A1* | 1/2019 | Candido | G05D 1/0094 |
| 2019/0193563 A1 | 6/2019 | Roberts | B60L 58/12 |
| 2020/0207326 A1* | 7/2020 | Wenger | B60H 1/00771 |
| 2020/0286388 A1* | 9/2020 | Velastri | G08G 5/006 |
| 2021/0089134 A1* | 3/2021 | Tran | G08G 5/0021 |
| 2021/0124352 A1* | 4/2021 | Candido | G08G 5/0013 |
| 2022/0146272 A1* | 5/2022 | Verma | G01C 21/3446 |

OTHER PUBLICATIONS

Lotze, et al., "The Role of Battery Management Systems in Autonomous Drive", Sep. 2018, downloaded from "https://mybusinessfuture.com/en/the-role-of-battery-management-systems-in-autonomous-drive/".

EP Office Action Mailed on Jun. 25, 2024 for EP Application No. 21181888, 5 page(s).

* cited by examiner

SYSTEMS AND METHODS FOR MANAGING ENERGY USE IN AUTOMATED VEHICLES

CROSS-REFERENCE TO RELATED APPLICATION(S)

This application claims the benefit of priority under 35 U.S.C. § 119 from Indian Patent Application No. 202041027835, filed on Jun. 30, 2020, the contents of which are incorporated by reference in their entirety.

TECHNICAL FIELD

Various embodiments of the present disclosure relate generally to systems and methods for automated vehicles and, more particularly, to systems and methods for managing the energy use in automated vehicles.

BACKGROUND

Urban air mobility (UAM) vehicles may be used in many situations, such as light-weight delivery and as a substitution for manned operations in remote locations. UAM vehicles may include integrated intelligent decision systems for controlling and managing flight missions without human operators. However, weather conditions may impact a battery residual charge and alter its current supplying properties, which may reduce a mission duration, posing a threat to the safety of the UAM vehicles and their surroundings. For example, strong cross winds, extreme temperatures, higher humidity, and/or precipitation may result in conditions in which a UAM vehicle's batteries are drained quickly, resulting in an uncompleted mission.

The present disclosure may overcome one or more of the above-referenced challenges. For example, the present disclosure relates to providing UAM vehicles with end-to-end control systems that provide support for automated vehicles throughout an entire mission.

SUMMARY OF THE DISCLOSURE

According to certain aspects of the disclosure, systems and methods are disclosed for managing energy use in automated vehicles.

For instance, a method may include receiving forecasted data from a first external source, the forecasted data comprising at least one weather parameter predicted at a first location at a first time; receiving real-time data corresponding to the at least one weather parameter at the first location at the first time, the real-time data being received from at least one of a second external source and/or a sensor connected to the vehicle; continuously determining whether to perform an adjustment to a control parameter of the vehicle by using a machine learning model that is based on the forecasted data for the at least one weather parameter, the real-time data for the at least one weather parameter, a battery condition of the vehicle, and/or an estimated amount of energy consumed by traveling along a first navigation path; and in response to determining that an adjustment to a control parameter of the vehicle is to be performed, controlling the vehicle by performing the adjustment to the control parameter of the vehicle.

A system may include a memory storing instructions; and a processor executing the instructions to perform a process. The process may include: receiving forecasted data from a first external source, the forecasted data comprising at least one weather parameter predicted at a first location at a first time; receiving real-time data corresponding to the at least one weather parameter at the first location at the first time, the real-time data being received from at least one of a second external source and/or a sensor connected to the vehicle; continuously determining whether to perform an adjustment to a control parameter of the vehicle by using a machine learning model that is based on the forecasted data for the at least one weather parameter, the real-time data for the at least one weather parameter, a battery condition of the vehicle, and/or an estimated amount of energy consumed by traveling along a first navigation path; and in response to determining that an adjustment to a control parameter of the vehicle is to be performed, controlling the vehicle by performing the adjustment to the control parameter of the vehicle.

A non-transitory computer-readable medium may store instructions that, when executed by a processor, cause the processor to perform a method. The method may include: receiving forecasted data from a first external source, the forecasted data comprising at least one weather parameter predicted at a first location at a first time; receiving real-time data corresponding to the at least one weather parameter at the first location at the first time, the real-time data being received from at least one of a second external source and/or a sensor connected to the vehicle; continuously determining whether to perform an adjustment to a control parameter of the vehicle by using a machine learning model that is based on the forecasted data for the at least one weather parameter, the real-time data for the at least one weather parameter, a battery condition of the vehicle, and/or an estimated amount of energy consumed by traveling along a first navigation path; and in response to determining that an adjustment to a control parameter of the vehicle is to be performed, controlling the vehicle by performing the adjustment to the control parameter of the vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods managing energy use in automated vehicles.

For example, the present disclosure relates to providing UAM vehicles with end-to-end control systems that provide support for automated vehicles throughout an entire mission, including the planning phase (e.g., preflight) and during the flight. One or more embodiments may include maintenance planning, recharge planning for main/active and secondary/standby battery units, based on prediction, to ensure that a UAM vehicle may complete a mission. UAM vehicles are expected to carry out long missions, but may be powered by on-board batteries with limited capacity. The present disclosure relates to optimizing energy use by continually predicting and monitoring how the battery may be effected by any situations (e.g., weather conditions, mechanical failure, obstacles, other vehicles, etc.) that may arise before and during a flight. The present disclosure relates to a fully automated mission planning system, both in pre-flight as well as in-flight situations, that may accurately assess the impact of these situations to the vehicle's battery and recommend corrective options for the vehicle, if necessary. Systems and methods in the present disclosure provide improved functionality and efficiency in controlling automated vehicles.

While this disclosure describes the systems and methods with reference to aircraft (e.g., autonomous aircraft), it should be appreciated that the present systems and methods are applicable to management of vehicles, including those of drones, automobiles (e.g., e-automobiles and autonomous automobiles), ships (e.g., autonomous ships), or any other autonomous and/or Internet-connected vehicle. For example, an electric vehicle may monitor a battery status and perform one or more methods to mitigate a risk of a depleted battery.

Further, it should be appreciated that the present systems and methods may be used for flights with human passengers and/or flights that carry non-human cargo.

Figure 1:
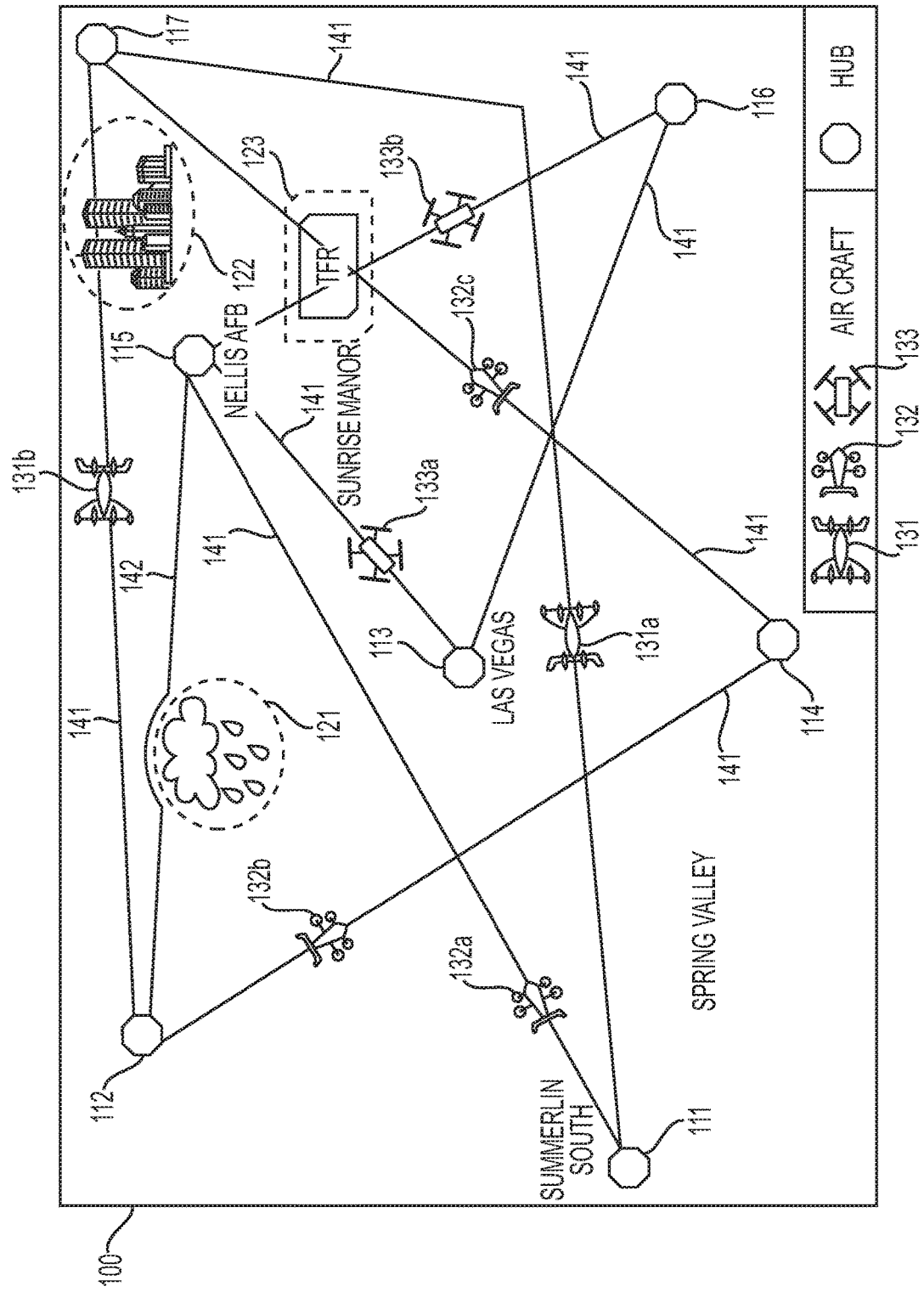
FIG. 1 depicts an example environment in which methods, systems, and other aspects of the present disclosure may be implemented.

FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131*a*-133*b*, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131*a*-133*b* may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131*a* and 131*b*), model 132 (aircraft 132*a*, 132*b*, and 132*c*), and model 133 (aircraft 133*a* and 133*b*).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the safest and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 142 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131*b* may predict, prior to take-off, that spatial restriction 122, caused by buildings, would hinder the direct flight path of aircraft 131*b* flying from hub 112 to hub 117, as depicted in FIG. 1. In response to that prediction, the vehicle management computer of aircraft 131*b* may generate a 4-D trajectory with a vehicle path that bypasses a 3-dimensional zone (e.g., zone including the location and the altitude) associated with those particular buildings. As yet another example, the vehicle management computer of aircraft 133*b* may predict, prior to take-off, that TFR 123, as well as some potential 4-D trajectories of another aircraft 132*c*, would hinder or conflict with the direct flight path of aircraft 133*b*, as depicted in FIG. 1. In response, the vehicle management computer of aircraft 133*b* may generate a 4-D trajectory with path and time coordinates that do not intersect either the 4-D coordinates of the TFR 123 or the 4-D trajectory of the other aircraft 132*c*. In this case, the TFR 123 and collision risk with another aircraft 132*c* are examples of dynamic factors which may or may not be in effect, depending on the scheduled time of travel, the effective times of TFR, and the path and schedule of the other aircraft 132*c*. As described in these examples, the 4-D trajectory derivation process, including any modification or re-negotiation, may be completed prior to take-off and in-flight for the aircraft.

As another example, the vehicle management computer of aircraft 131*b* may determine to use one of the routes 141 that are set aside for aircraft 131 to use, either exclusively or non-exclusively. The aircraft 131*b* may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
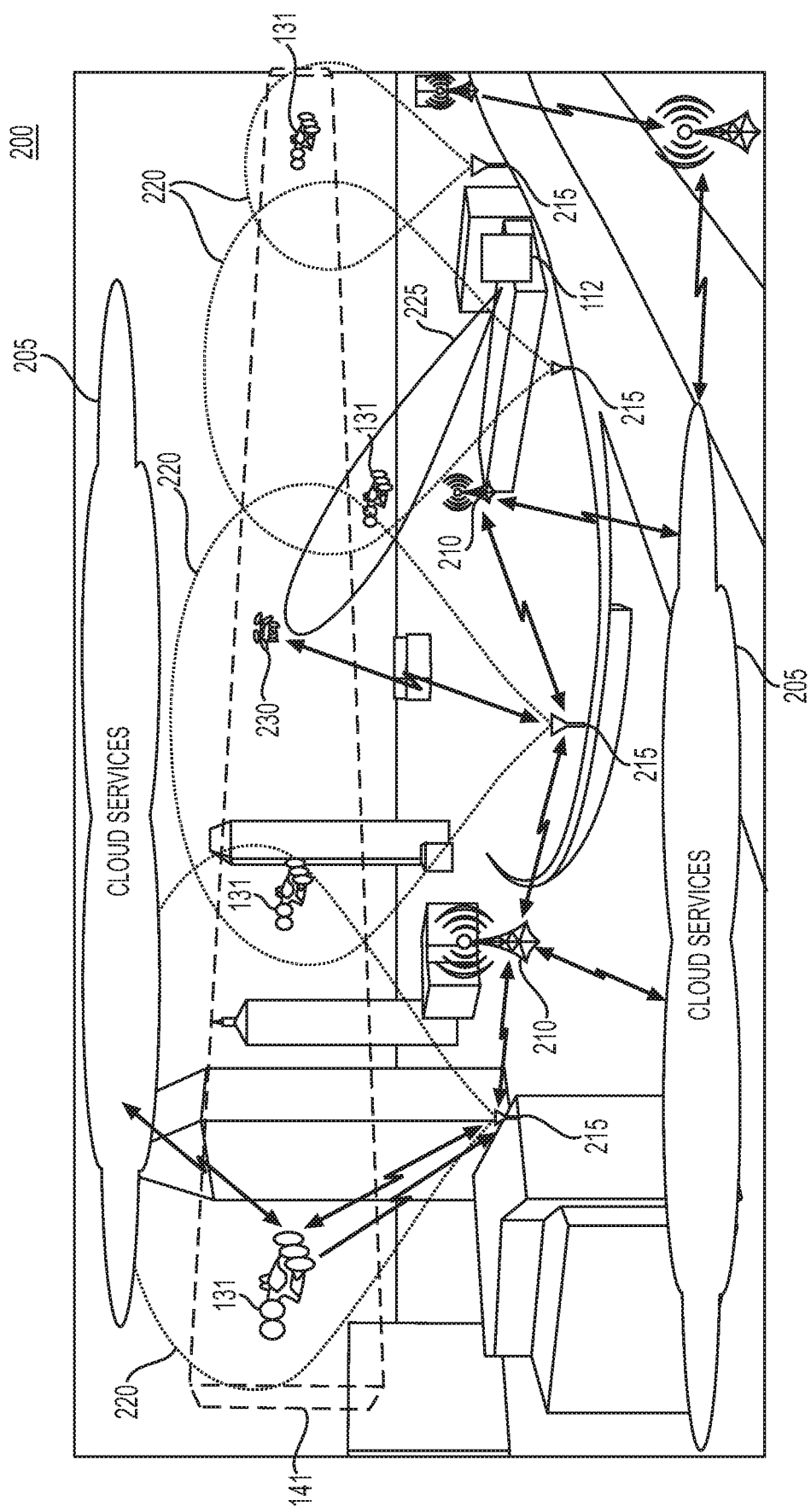
FIG. 2 depicts an exemplary system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, location, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
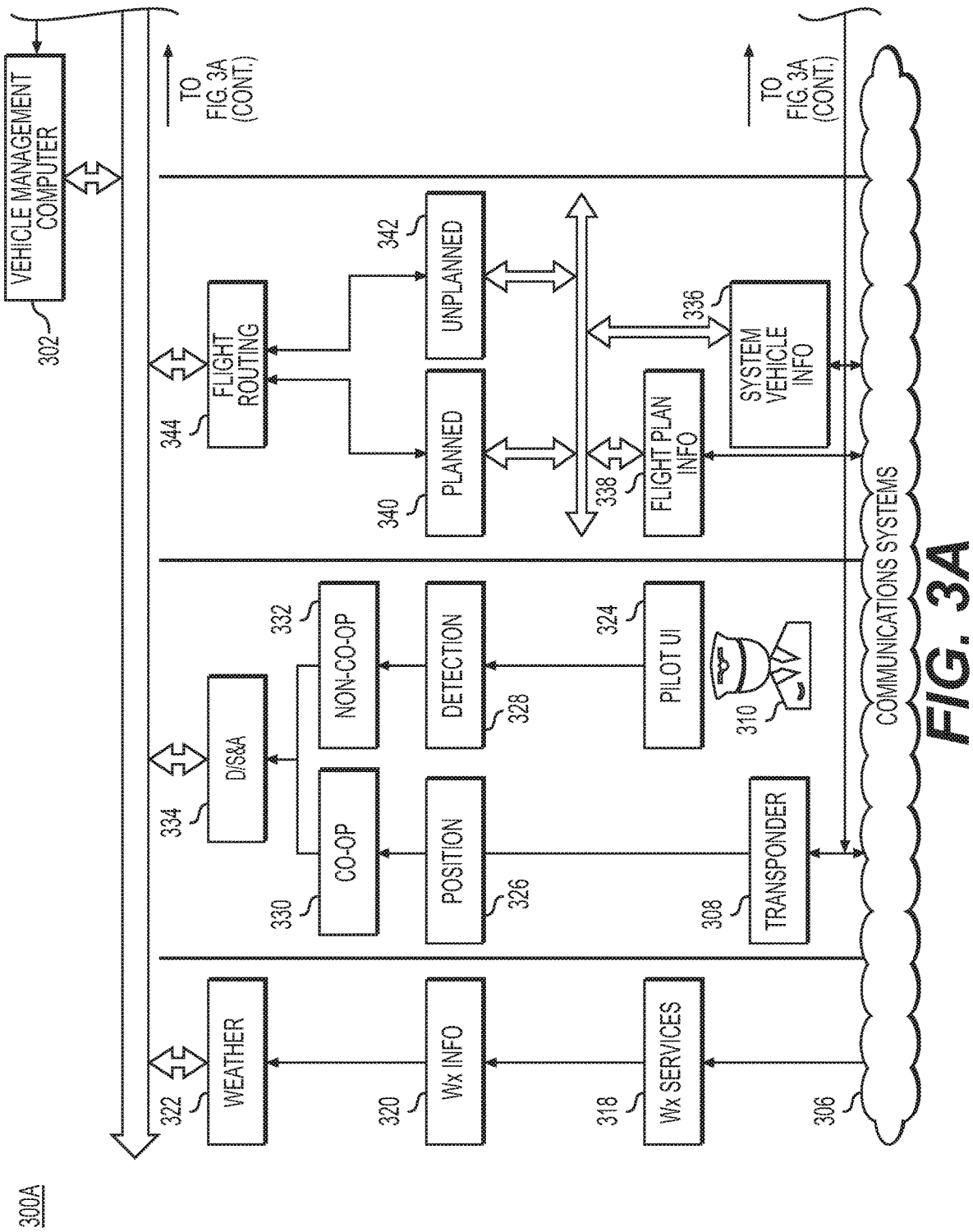
FIGS. 3A and 3B depict exemplary block diagrams of a vehicle of a system, according to one or more embodiments.
Figure 3A:
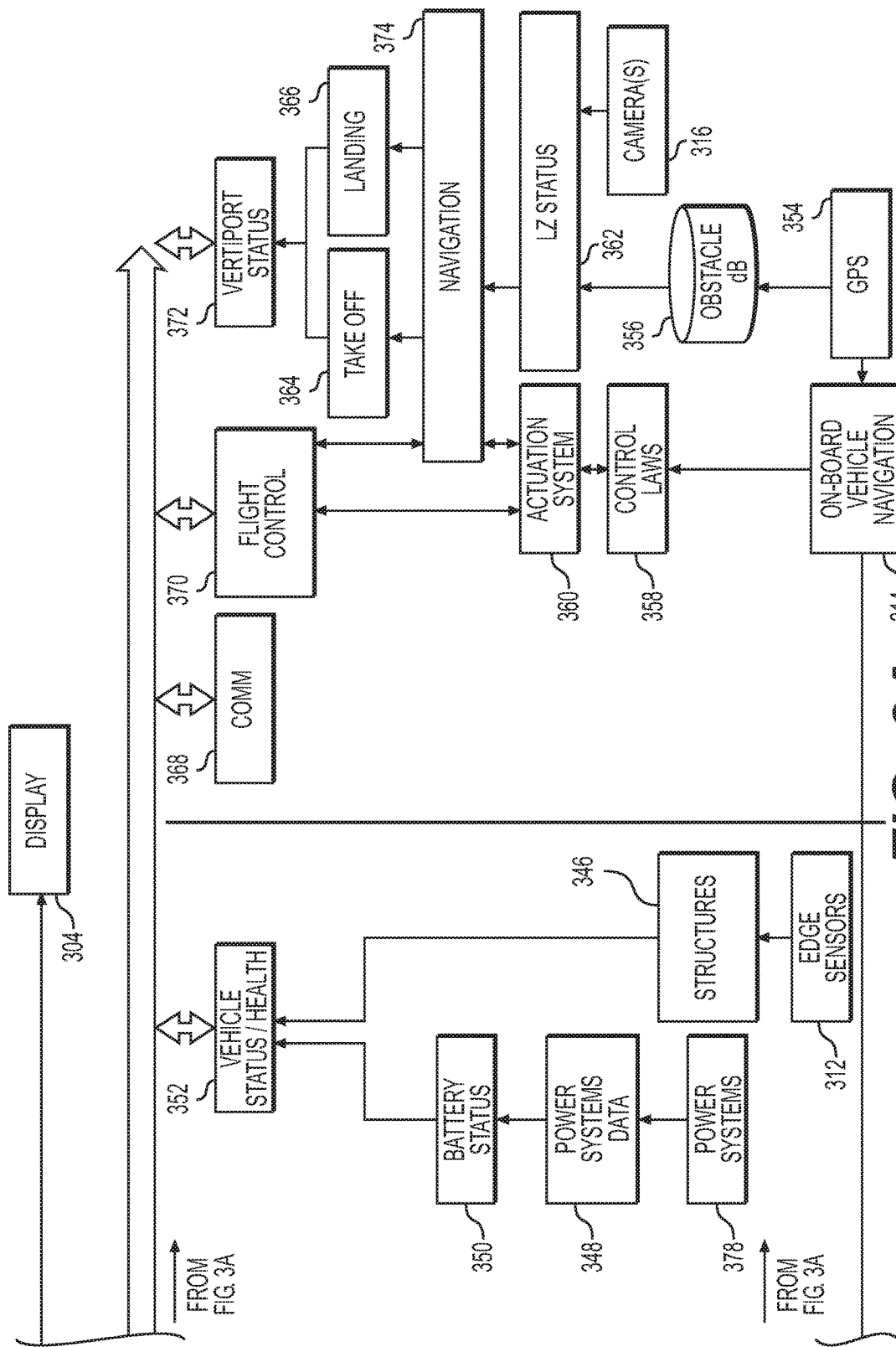
Figure 3B:
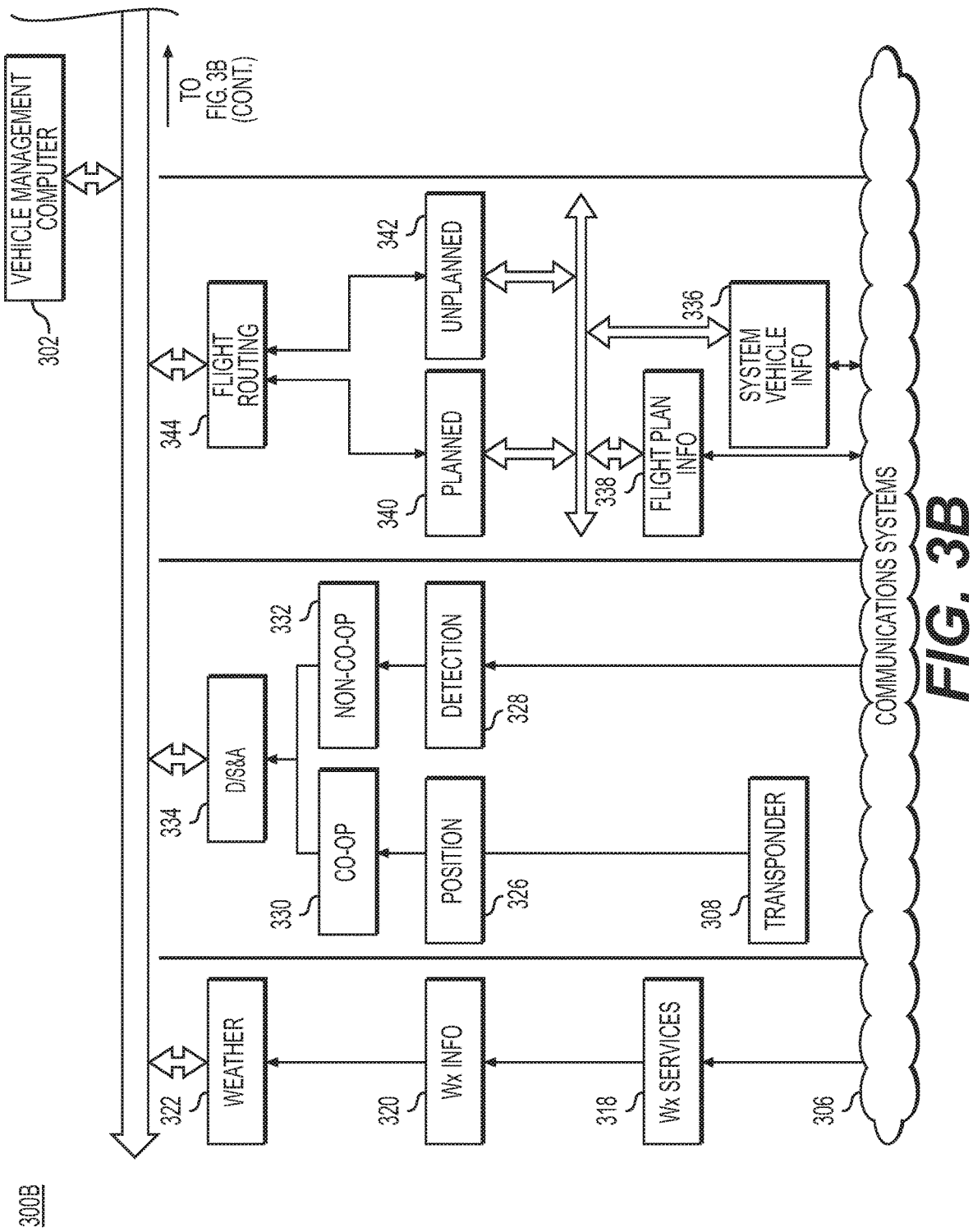
Figure 3B:
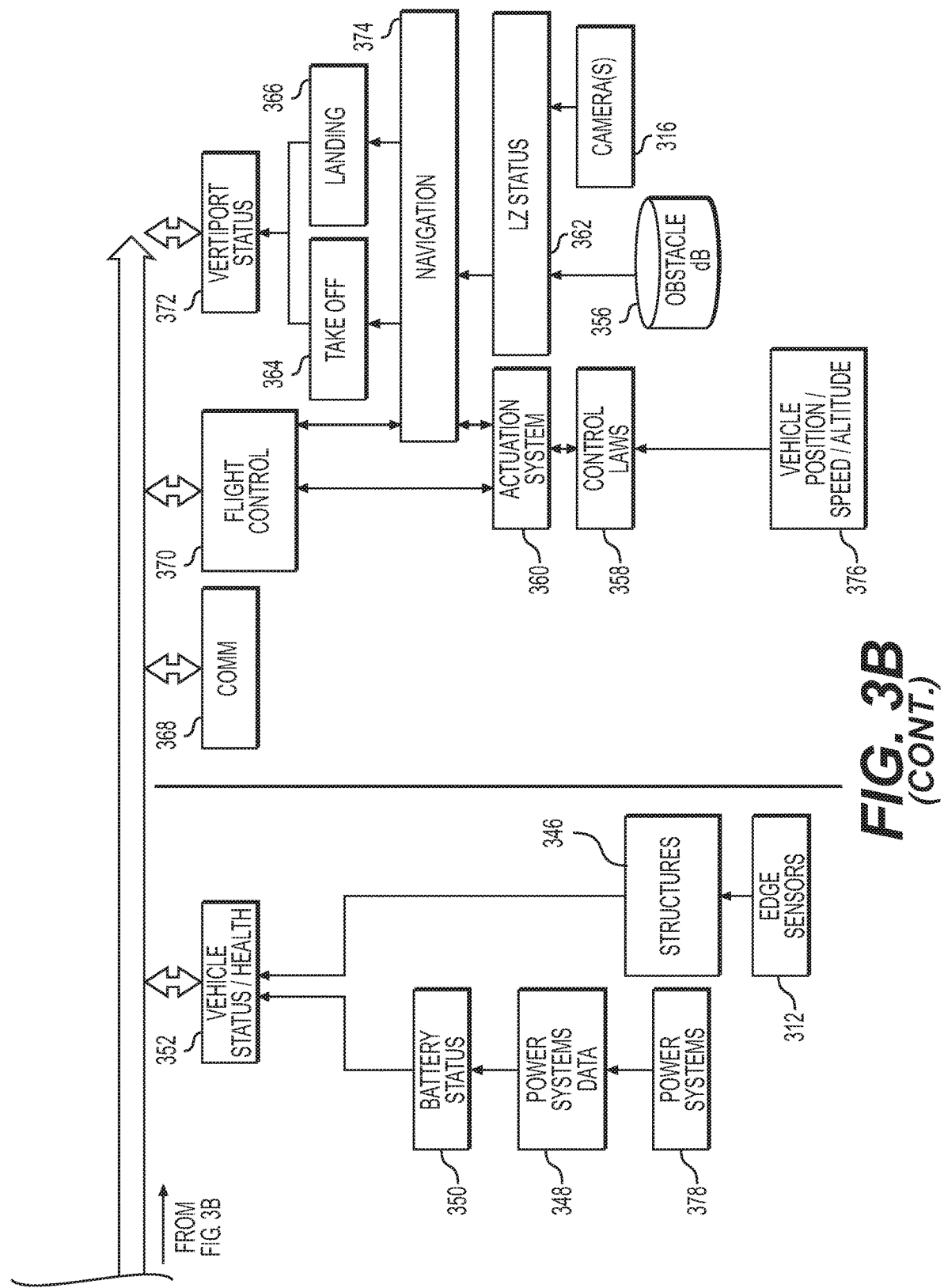

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/Sense and Avoid (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, location, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, location, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc., of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, rotors, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include infrared or optical cameras, LIDAR, or other visual imaging systems to record internal or external environments of the aircraft 131. The camera(s) 316 may obtain infrared images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc., for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), an Inertial Navigation System (INS) coupled to a GNSS system, and/or one or more air data module(s). The one or more radar(s) may be weather radar(s) to scan for weather and/or light weight digital radar(s), such as DAPA radar(s) (either omnidirectional and/or directional), to scan for terrain/ground/objects/obstacles. The one or more radar(s) may obtain radar information. The radar information may include information about the local weather and the terrain/ground/objects/obstacles (e.g., aircraft or obstacles and associated locations/movement). Additionally, the one or more radar(s) may include short distance sensing radar that may sense turbulence (e.g., weather conditions or obstacles) near the vehicle. The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The weather information may include forecasted weather information and/or real-time weather information. The route weather information may include information about precipitation, wind, turbulence, storms, cloud coverage, visibility, etc., of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, location, track, etc., of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management computer 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc., for a given circumstance.

The vertiport status program 372 may control the aircraft 131 during take-off (by executing a take-off process 364) and during landing (by executing a landing process 366). The take-off process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

Figure 4:
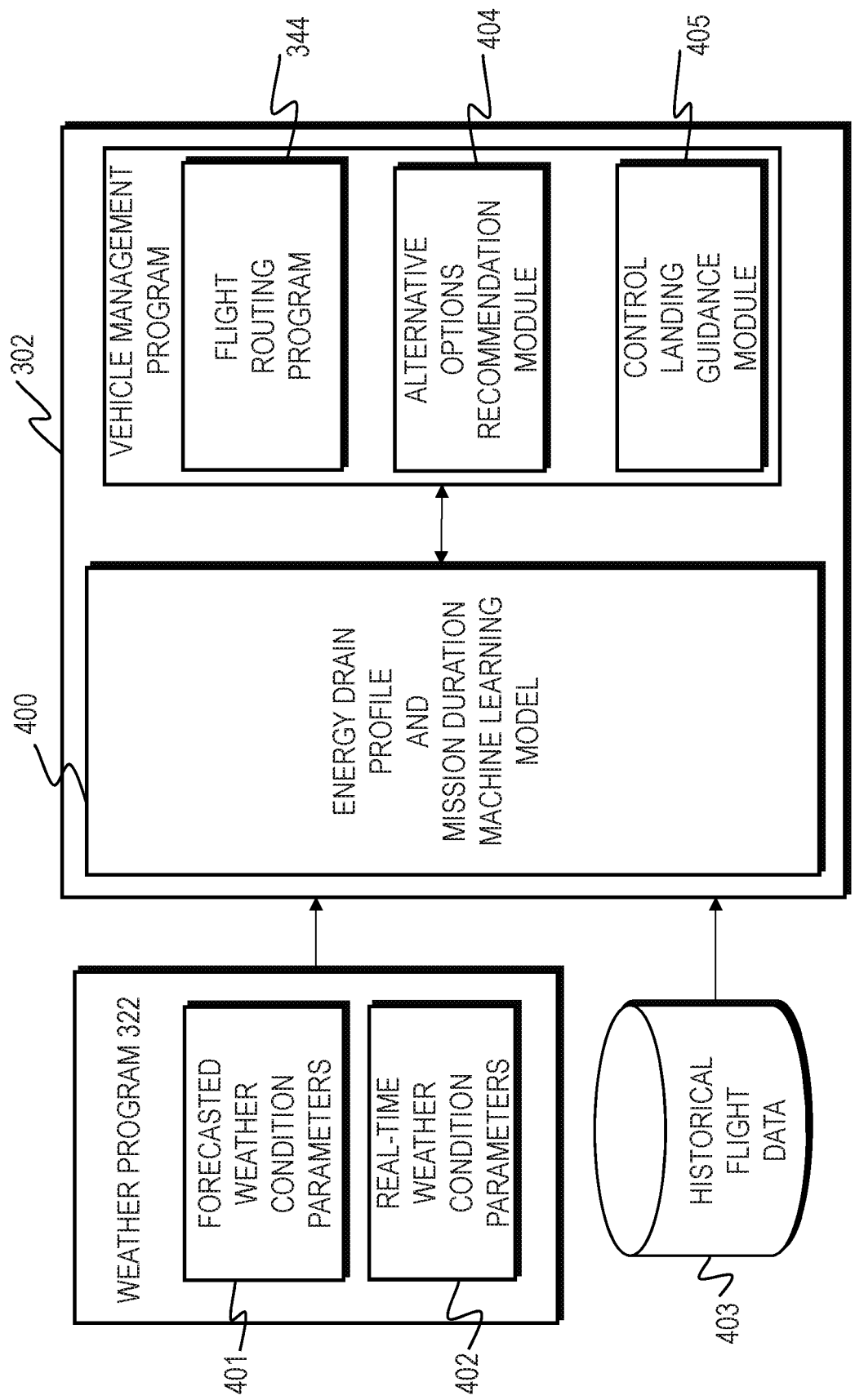
FIG. 4 depicts an exemplary block diagram for an energy drain profile and mission duration machine learning model that provides an end-to-end fully autonomous UAM vehicle, according to one or more embodiments.

FIG. 4 depicts an exemplary block diagram for an energy drain profile and mission duration machine learning model 400 that provides an end-to-end fully autonomous UAM vehicle, according to one or more embodiments. According to one embodiment, the machine learning model 400 may be realized using the vehicle management computer 302. However, exemplary embodiments are not limited to this. For example, the machine learning model 400 may also be realized using a cloud service 205 that transmits information to the vehicle management computer 302.

The machine learning model 400 may receive forecasted weather condition parameters 401, real-time weather condition parameters 402, historical flight data 403, data from the flight routing program 344, data from an alternative options recommendation module 404, and/or data from a control landing guidance module 405. The machine learning model 400 may dynamically analyze the weighted variables and provide an output to the vehicle management program, which may include the flight routing program 344, the alternative options recommendation module 404, and/or the control landing guidance module 405.

The machine learning model 400 may be a trained policy (e.g., if the machine learning model 400 is trained using a reinforcement learning technique), an analytical model, a neural network, and/or, generally, a model that that takes inputs (e.g., a feature set) and outputs a target (e.g., a target position) based on a trained function. The function may be trained using a training set of labeled data, while deployed in an environment (simulated or real), or while deployed in parallel to a different model to observe how the function would have performed if it was deployed.

The forecasted weather condition parameters 401 may be received from one or more external sources (e.g., weather information services 318, local weather information from weather radars). The real-time weather information may be received from one or more external sources (e.g., weather information services 318, local weather information from weather radars) and/or from instruments connected to the vehicle (e.g., sensors, radars, on-board vehicle navigation systems 314, such as the air data module(s), etc.).

The historical flight data 403 may include a database of weather data and a relationship between a particular weather condition and its impact on battery charge and energy drain during a mission. For example, the historical flight data 403 may include vehicle usage patterns and/or an energy drain profile, which may identify a percentage of energy drain per unit charge in a given weather parameter over time (e.g., one degree reduction in temperature may reduce 2% battery charge per five minutes). The historical flight data may include a detailed analysis about previous flights and weather patterns during those flights, and how the battery was affected during those flights when particular weather events occurred.

The historical flight data 403 may include data that identifies an impact that temperature has on energy drain. For example, the historical flight data 403 may identify that in both hot and cold environments, motors, engines, rotors, and/or propellers on the vehicle work harder, which reduces battery life and causes shorter flight times. Further, the heat generated by a harder working motor may cause an overheating of the electronics and/or melting of the wired connections. Thus, the machine learning model 400 may recommend longer downtimes between flights flown in hot and/or cold environments. Further, in cold environments, the machine learning model 400 may recommend shorter flights and recommend monitoring battery life closely because the efficiency of a lithium polymer (LiPo) battery may decrease. As an example, if the temperature outside is below freezing, a battery level may go from 100% to 35% much more quickly than it would at room temperature. Additionally, in cold environments, there is a greater chance that a battery will drop below a critical voltage that will cut off the electronic speed controls (ESCs) and motors; thus, the battery should not be stressed to its limits in cold conditions.

The historical flight data 403 may include data that identifies an impact that humidity has on energy drain. Humidity may be defined as an amount of water vapor present in air and may be expressed as a percentage of the amount needed for saturation at the same temperature. If humidity is close to 1, then a UAM vehicle may be wet when it lands even if it did not rain during the flight. Further, long-term use in humid environments may have a long term effect on equipment even if the effect is not noticed from flight to flight. Humidity also increases the density altitude. For example, water vapor is lighter than the molecules that make up air. Therefore, in high humidity conditions, motors, engines, rotors, and/or propellers on the vehicle may have to work harder to generate lift, and battery life will be reduced. Thus, the machine learning model 400 may take into account humidity during the preflight planning phase when determining a planned flight path 340 and during the flight when determining the control parameters for the vehicle (e.g., unplanned flight path 342).

The historical flight data 403 may include data that identifies an impact that wind has on energy drain. For example, higher wind speeds may make it more difficult for vehicles to hold positioning, which may result in shorter flight times, less accurate position holds, and/or more difficult maneuvering. Thus, a machine learning model 400 may recommend that a vehicle not fly in conditions where wind gusts may exceed a UAM vehicle's top speed. For example, if an average wind speed for a given day is 20 MPH, but there may be wind gusts up to 40 MPH, then the vehicle should plan for and account for the 40 MPH wind. Additionally, flying a vehicle in a windy environment (e.g., headwinds) uses more power than in less windy environments, and the battery may drain faster than normal. Thus, the machine learning model 400 should take into account wind speeds, and may recommend to not fly in high winds or headwinds. Additionally, the machine learning model may learn to recommend a newer 4D trajectory to compensate for the windy condition with constraints levied by the vehicle performance limits.

The historical flight data 403 may include data that identifies an impact that precipitation has on energy drain. UAM vehicles may not operate optimally in rain, sleet, and/or snow. Even slight rain may put a heavy load on the battery. Precipitation probability may be defined as a probability of precipitation at a given time at a given location. Determining a precipitation probability and a predicted precipitation intensity may help to predict the most likely conditions for that day. The machine learning model 400 may then use the precipitation probability and predicted intensity for a UAM vehicle's mission planning before and during a flight to prepare for a worst-case scenario, and to effectively utilize the battery for a more optimal mission duration.

The historical flight data 403 may include data that identifies an impact that fog has on energy drain. Moisture may affect the operation of UAM vehicles, regardless of the form of the moisture. Visibility may be measured as the distance at which an object or light can be clearly discerned and may be defined in miles or kilometers. If visibility is less than 0.5 miles, then there is a high probability of fog. Another potential problem with foggy conditions is that a UAM vehicle cannot be seen past a certain point, and FAA laws may prohibit flying a UAM vehicle Beyond Visual Line of Sight (BVLOS). Thus, the machine learning model 400 should identify and account for a fog probability for mission planning before and during a flight.

According to one embodiment, a machine learning model 400 may include an energy drain profile and a mission duration machine learning model that provides an end-to-end fully autonomous UAM vehicle. For example, one or more aircraft 131 (e.g., of the block diagram 300B) may include a vehicle management system 302 in which a machine learning model 400 may be used in both the planning phase of a mission (e.g., preflight) and during an actual flight so the vehicle management computer 302 is continuously and dynamically updated. As described above, historical weather data 403 may include an energy drain profile that accounts for many situations involving many different weather events and their impact on the battery condition. This data may be processed in conjunction with the proposed route from flight routing program 344 and analyzed by the machine learning model 400 to provide an effective mission duration model. The machine learning model 400 may also use a learning technique in which historical flight data from multiple vehicles over many vehicle flights are analyzed and the weights of the inputs of the machine learning model 400 are continuously and dynamically updated to improve the accuracy of the machine learning model 400 over time.

As described above, the machine learning model 400 may use any or all of the weighted input parameters (e.g., forecasted weather data, real-time weather data, historical flight data, alternative options recommendation, landing guidance, and/or flight routing program, etc.) to analyze and provide an output to the vehicle management program, which may include the flight routing program 344, alternative options recommendation module 404, and/or a control landing guidance module 405.

For example, the machine learning model may determine whether to recommend alternative options for adjusting a control parameter of the vehicle. If the machine learning model 400 determines that alternative options should be deployed, then it may provide alerts to an operator and/or take corrective action by automatically providing inputs for flight control. For a fully autonomous flight, it may command and control the vehicle to take the corrective action.

For flights that carry human passengers, a corrective pre-flight corrective option may be to reduce a payload by allowing fewer human passengers. Additionally, fleet selection may be based on a predicted battery charge for a planned flight.

According to one or more embodiments, recommended alternative corrective options may include at least one of (1) suggesting an alternative flight path; (2) adjusting a travel distance and/or travel time; (3) making the trip a one-way trip for successful mission completion; (4) providing an alert to an operator; (5) changing inputs to flight controls (e.g., reducing power by reducing number and RPM of rotors, motors, engines, ducted fans, and/or propellers); (6) limiting the flight envelope by reducing higher attitudes and descent/ascent rates; (7) utilizing the additional standby power source on-board to complete the current mission; and/or (8) using a power conditioner module to manage available power vs. needed power by cutting power to non-critical systems. For example, the power may be managed by creating a list of UAM/UAV/Aircraft systems with categorization based on criticality and storing the list in a database based on a priority order (e.g., critical systems may have higher priority than inflight entertainment). This database with the priority list may be used to remove power from lowest priority systems to higher priority systems in the priority list database. Additionally, the list of non-critical systems and order of priority for power usage may be pre-configured.

The control landing guidance module 405 may be used to analyze how much energy may be necessary to land the vehicle. This information may be provided to the machine learning model 400 to predict and determine whether there is sufficient energy in the battery to land the vehicle. For example, once the vehicle reaches a destination, the vehicle must have sufficient energy to safely land. Thus, the machine learning model 400 may use any or all of the weighted input parameters (e.g., forecasted weather data, real-time weather data, historical flight data, alternative options recommendation, landing guidance, and/or flight routing program, etc.) to predict an amount of energy required for landing, and take corrective action if it determines that there may be insufficient energy to land the vehicle. As another example, when a battery charge is depleted, the UAM may be directed to a closest base station for recharging and/or replacing the battery. Additionally, an alert (e.g., audible and/or visual) may be provided in the vehicle and provided to a base station to ensure it is prepared for emergency procedures.

According to one embodiment, the machine learning model 400 may identify, predict, and take corrective action to address any internal faults that may deplete battery conditions (e.g., short circuits) of any internal circuitry. The machine learning model 400 may also predict intermittent maintenance issues that might arise with the vehicle's battery and other control systems. For example, the machine learning model 400 may be used to generate battery replacement dates and determine a warranty duration for the battery. Based on the machine learning model, a database may be created for UAMs with the battery statistics that may be helpful in selection criteria for the UAMs for long range and/or short range missions. The data on the battery discharge statistics may also be shared to battery designers and suppliers for a re-design. The machine learning model may also recommend replacement dates for the propulsion or actuation motors by historically monitoring their power usage if it determines the consumption is persistently beyond nominal range. According to one embodiment, a manufacturer may supply a battery model to augment the machine learning model 400. Further, according to one embodiment, the machine learning model 400 may be part of the FMS's Perf integration for cost inclusion in the flight routing program 344.

Additionally, the machine learning model 400 may compute a confidence level of the mission being completed based on current conditions. If the confidence level dips below a predetermined value (e.g., 50%), then corrective options may be recommended or deployed by the machine learning model. The predetermined value may be set by a user or determined automatically by the machine learning model 400. The predetermined value at which corrective action is taken may be adjusted based on several factors (e.g., human carrying vs. cargo only, importance of mission, cost of vehicle, complexity of mission, danger of failure (e.g., populated area, humans on board vehicle), etc.). For example, if the vehicle is carrying humans, the cost of the vehicle is high, the mission is important, and/or the mission is performed in a populated area, then the predetermined value may be set at a very high level (e.g., 99%), so that corrective action would be taken quickly if the machine learning model determines the mission may not be completed. Conversely, if the vehicle is carrying cargo and not humans, the cost of the vehicle is low, and/or it is in an unpopulated area, the predetermined value may be set at a low level (e.g., 1%). However, with human carrying operations, the cost of the vehicle should not be a primary factor. These are merely exemplary predetermined values and any predetermined value may be selected depending on the situation.

Figure 5:
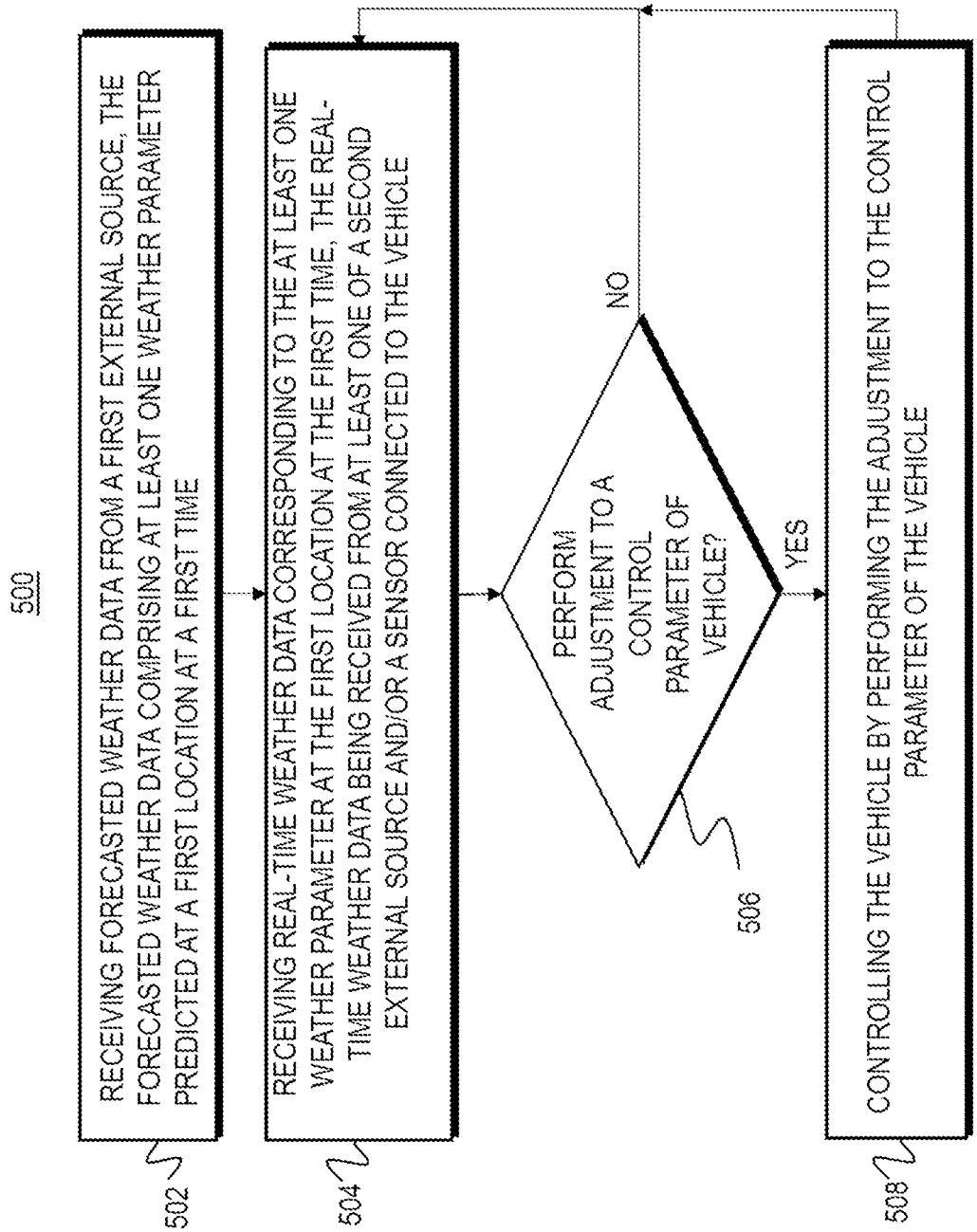
FIG. 5 depicts a flowchart for managing energy use in automated vehicles, according to one or more embodiments.

FIG. 5 depicts a flowchart for managing energy use in automated vehicles, according to one or more embodiments. The flowchart may depict a process 500 for analyzing weather events and predicting their impact on a battery condition of the vehicle.

According to one embodiment, the process may include receiving forecasted weather data from a first external source, the forecasted weather data comprising at least one weather parameter predicted at a first location at a first time (e.g., block 502). The at least one weather parameter may include at least one of wind speed, wind direction, temperature, humidity, precipitation, fog, and/or altitude.

The process 500 may further include receiving real-time weather data corresponding to the at least one weather parameter at the first location at the first time, the real-time weather data being received from at least one of a second external source and/or a sensor connected to the vehicle (e.g., block 504).

The process 500 may further include continuously determining whether to perform an adjustment to a control parameter of the vehicle by using a machine learning model that is based on the forecasted weather data for the at least one weather parameter, the real-time weather data for the at least one weather parameter, a battery condition of the vehicle, and/or an estimated amount of energy consumed by traveling along a first navigation path (e.g., block 506). For example, the process 500 may include continuously and dynamically monitoring the weather data, the battery condition, and the current flight path, to determine whether there is sufficient energy remaining in the battery to complete the mission. The continuous monitoring may be performed in the planning phase (e.g., preflight) and/or the usage phase (e.g., throughout the flight).

The process 500 may include, in response to determining that an adjustment to a control parameter of the vehicle is to be performed (e.g., block 506: Yes), controlling the vehicle by performing the adjustment to the control parameter of the vehicle (e.g., block 508). If it is determined that an adjustment to a control parameter is not to be performed at the time (e.g., block 506: No), then the process may include receiving further real-time weather data corresponding to the at least one weather parameter at the first location at the first time, the real-time weather data being received from at least one of a second external source and/or a sensor connected to the vehicle (e.g., block 504). The adjustment to the control parameter may include at least one of reducing a payload of the vehicle, suggesting an alternative flight path, adjusting a travel distance and/or travel time, making the trip a one-way trip for successful mission completion, providing an alert to an operator, changing inputs to flight controls (e.g., reducing power by reducing number and RPM of rotors, motors, engines, ducted fans, and/or propellers), and/or using a power conditioner module to manage available power vs. needed power by cutting power to non-critical systems.

Figure 6:
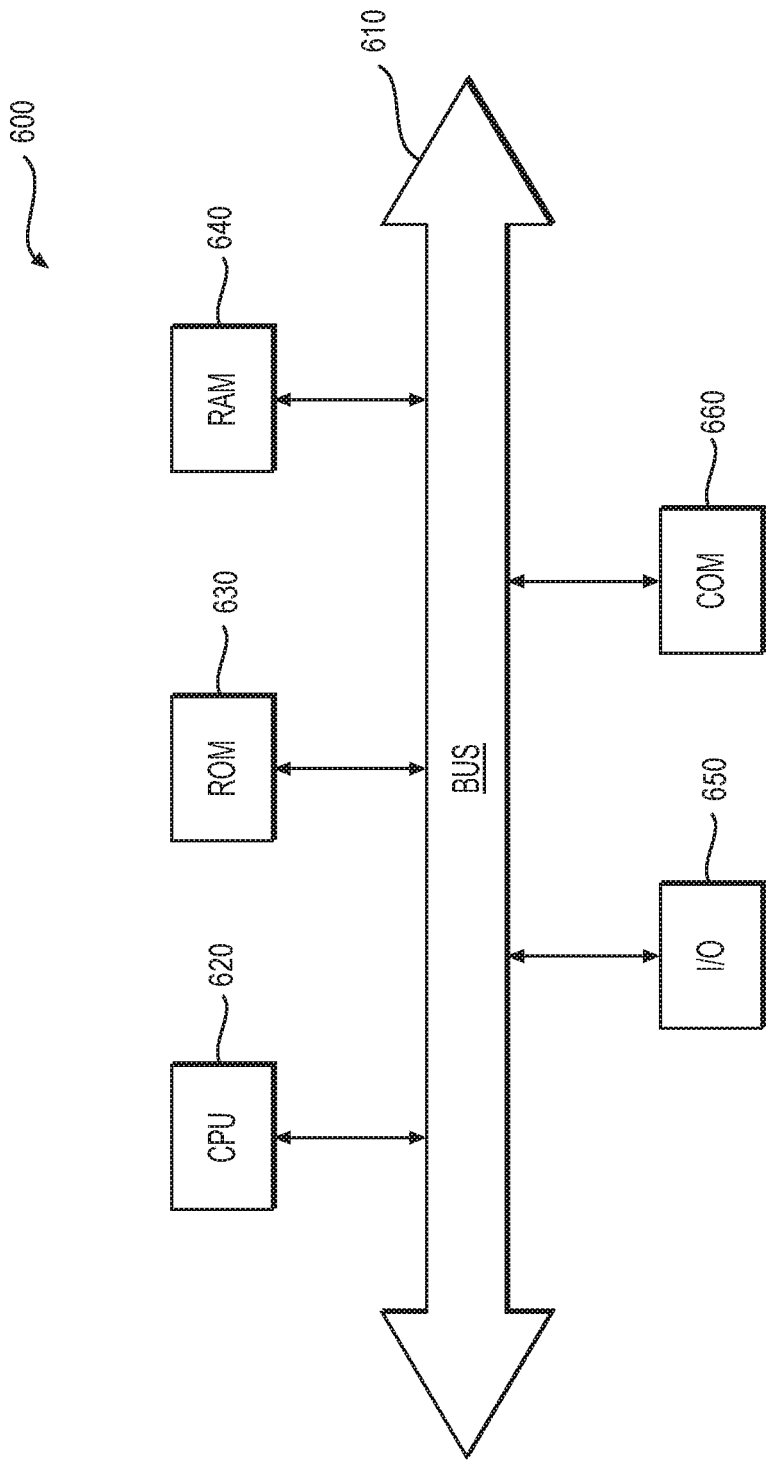
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors (e.g., a multicore processor), for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for managing energy use in a vehicle, the computer-implemented method comprising:
   receiving forecasted data from a first external source, the forecasted data comprising at least one forecasted weather parameter predicted along a first navigation path of the vehicle;
   receiving real-time data comprising at least one real-time weather parameter, the real-time data being received from at least one of a second external source and/or a sensor connected to the vehicle;
   receiving historical data including an energy drain profile comprising data that identifies an impact of historical weather parameters on battery charge and/or energy drain;

identifying, based at least in part on the at least one real-time weather parameter and the energy drain profile included in the received historical data, an effective mission duration model associated with the vehicle to determine whether an estimated battery charge level is sufficient to enable completion of a first trip of the vehicle defined along the first navigation path;

continuously determining whether to perform an adjustment to a control parameter of the vehicle by using a machine learning model that is based on the forecasted data comprising the at least one forecasted weather parameter, the real-time data comprising the at least one real-time weather parameter, the energy drain profile from the received historical data, the effective mission duration model, and at least one of a battery condition of the vehicle and an estimated amount of energy consumed by traveling along the first navigation path; and in response to determining that an adjustment to a control parameter of the vehicle is to be performed, controlling the vehicle by automatically performing the adjustment to the control parameter of the vehicle;

wherein the adjustment to the control parameter comprises adjusting one or more of a number of rotors being supplied power and a number of propellers being supplied power.

2. The computer-implemented method of claim 1, wherein the adjustment to the control parameter of the vehicle is performed in response to a confidence level of completing the first navigation path being below a predetermined value, wherein the predetermined value is adjusted based on the first navigation path traveling above a populated area.

3. The computer-implemented method of claim 1, wherein continuously determining whether to perform the adjustment to the control parameter of the vehicle comprises monitoring the real-time data, the battery condition of the vehicle, and/or the estimated amount of energy consumed by traveling along the first navigation path, when the vehicle is airborne.

4. The computer-implemented method of claim 1, wherein the adjustment to the control parameter comprises at least one of adjusting inputs to flight controls, changing the first navigation path to a second navigation path, and/or turning off non-essential systems.

5. The computer-implemented method of claim 1, wherein each of the at least one forecasted weather parameter and the at least one real-time weather parameter comprises at least one of wind speed, wind direction, temperature, humidity, precipitation, fog, and/or altitude.

6. The computer-implemented method of claim 1, wherein the real-time data comprises radar information identifying at least one object, and wherein the adjustment to the control parameter comprises changing the first navigation path to a second navigation path in response to determining that the real-time data comprises at least one object identified in the first navigation path.

7. A system for managing energy use in an aircraft, the system comprising:

at least one memory storing instructions; and at least one processor executing the instructions to perform a process comprising:

receiving forecasted data from a first external source, the forecasted data comprising at least one forecasted weather parameter predicted along a first navigation path of the aircraft;

receiving real-time data comprising at least one real-time weather parameter, the real-time data being received from at least one of a second external source and/or a sensor connected to the aircraft;

receiving historical data including an energy drain profile comprising data that identifies an impact of historical weather parameters on battery charge and/or energy drain;

identifying, based at least in part on the at least one real-time weather parameter and the energy drain profile included in the received historical data, an effective mission duration model associated with the aircraft to determine whether an estimated battery charge level is sufficient to enable completion of a first trip of the aircraft defined along the first navigation path;

continuously determining whether to perform an adjustment to a control parameter of the aircraft by using a machine learning model that is based on the forecasted data comprising the at least one forecasted weather parameter, the real-time data comprising the at least one real-time weather parameter, the energy drain profile from the received historical data, the effective mission duration model, and at least one of a battery condition of the aircraft, and an estimated amount of energy consumed by traveling along the first navigation path when the aircraft is airborne; and in response to determining that an adjustment to a control parameter of the aircraft is to be performed, controlling the aircraft by automatically performing the adjustment to the control parameter of the aircraft, wherein the adjustment to the control parameter comprises adjusting one or more of a number of rotors being supplied power and a number of propellers being supplied power.

8. The system of claim 7 for managing energy use in the aircraft, wherein the adjustment to the control parameter of the aircraft is performed in response to a confidence level of completing the first navigation path being below a predetermined value, the confidence level being determined based at least in part on the estimated battery charge level.

9. The system of claim 7 for managing energy use in the aircraft, wherein the adjustment to the control parameter of the aircraft is performed in response to a confidence level of completing the first navigation path being below a predetermined value, and wherein the predetermined value is adjusted based on at least one of a cost of the aircraft and/or the first navigation path traveling above a populated area.

10. The system of claim 7 for managing energy use in the aircraft, wherein the adjustment to the control parameter comprises at least one of adjusting inputs to flight controls, changing the first navigation path to a second navigation path, and/or turning off nonessential systems.

11. The system of claim 7 for managing energy use in the aircraft, wherein the real-time data comprises radar information identifying at least one object, and wherein the adjustment to the control parameter comprises changing the first navigation path to a second navigation path in response to determining that the real-time data comprises at least one object identified in the first navigation path.

12. The computer-implemented method of claim 1, wherein the first navigation path is determined such that 4-D coordinates of the first navigation path bypass a 3-dimensional zone of a spatial restriction determined prior to a take-off of the vehicle.

13. The system of claim 7 for managing energy use in the aircraft, wherein the first navigation path is determined such that 4-D coordinates of the first navigation path bypass a 3-dimensional zone of a spatial restriction determined prior to a take-off of the aircraft.

14. The computer-implemented method of claim 1, wherein:
the at least one forecasted weather parameter is data indicative of an amount of humidity,
the at least one real-time weather parameter is data indicative of an amount of humidity,
the energy drain profile of the historical data comprises data that identifies an impact that humidity has on energy drain, and
the machine learning model determines the adjustment to the control parameter based on:
the at least one forecasted weather parameter that is data indicative of the amount of humidity,
the at least one real-time weather parameter that is data indicative of the amount of humidity, and
the energy drain profile of the historical data that comprises data that identifies the impact that humidity has on energy drain.

15. The computer-implemented method of claim 1, wherein:
the at least one forecasted weather parameter is data indicative of an amount of precipitation,
the at least one real-time weather parameter is data indicative of an amount of precipitation,
the energy drain profile of the historical data comprises data that identifies an impact that precipitation has on energy drain, and
the machine learning model determines the adjustment to the control parameter based on:
the at least one forecasted weather parameter that is data indicative of the amount of precipitation,
the at least one real-time weather parameter that is data indicative of the amount of precipitation, and
the energy drain profile of the historical data that comprises data that identifies the impact that precipitation has on energy drain.

16. The computer-implemented method of claim 1, wherein:
the at least one forecasted weather parameter is data indicative of an amount of wind,
the at least one real-time weather parameter is data indicative of an amount of wind,
the energy drain profile of the historical data comprises data that identifies an impact that wind has on energy drain, and
the machine learning model determines the adjustment to the control parameter based on:
the at least one forecasted weather parameter that is data indicative of the amount of wind,
the at least one real-time weather parameter that is data indicative of the amount of wind, and
the energy drain profile of the historical data that comprises data that identifies the impact that wind has on energy drain.

17. The computer-implemented method of claim 1, wherein:
the at least one forecasted weather parameter is data indicative of an amount of visibility,
the at least one real-time weather parameter is data indicative of an amount of visibility,
the energy drain profile of the historical data comprises data that identifies an impact that visibility has on energy drain, and
the machine learning model determines the adjustment to the control parameter based on:
the at least one forecasted weather parameter that is data indicative of the amount of visibility,
the at least one real-time weather parameter that is data indicative of the amount of visibility, and
the energy drain profile of the historical data that comprises data that identifies the impact that visibility has on energy drain.

18. The computer-implemented method of claim 1, wherein the vehicle is an aircraft, wherein the computer-implemented method further comprises:
computing a confidence level of completion of the first trip of the vehicle defined along the first navigation path based on current conditions, wherein the current conditions comprise current weather conditions and current battery conditions;
determining that the confidence level is below a predetermined value; and
deploying a corrective option, wherein the corrective option is limiting a flight envelope of the aircraft by reducing higher attitudes and descent or ascent rates.

19. The computer-implemented method of claim 1, wherein the machine learning model uses historical flight data from multiple vehicles over many vehicle flights to continuously determine whether to perform the adjustment to the control parameter of the vehicle.

20. The computer-implemented method of claim 1, wherein the machine learning model is configured to monitor power usage of a propulsion motor or an actuation motor of the vehicle, and wherein the computer-implemented method comprises recommending a replacement date for a propulsion motor or actuation motor when the machine learning model determines a consumption of the propulsion motor or the actuation motor is persistently beyond a nominal range.

* * * * *